United States Patent
Shi

(10) Patent No.: US 12,424,216 B2
(45) Date of Patent: Sep. 23, 2025

(54) INITIATING CONVERSATION MONITORING SYSTEM ACTION BASED ON CONVERSATIONAL CONTENT

(71) Applicant: CRESTA INTELLIGENCE INC., San Francisco, CA (US)

(72) Inventor: Tianlin Shi, Menlo Park, CA (US)

(73) Assignee: CRESTA INTELLIGENCE INC., San Francisco, CA (US)

( * ) Notice: Subject to any disclaimer, the term of this patent is extended or adjusted under 35 U.S.C. 154(b) by 394 days.

(21) Appl. No.: 17/829,093

(22) Filed: May 31, 2022

(65) Prior Publication Data
US 2023/0049813 A1    Feb. 16, 2023

Related U.S. Application Data

(63) Continuation of application No. 17/400,915, filed on Aug. 12, 2021, now Pat. No. 11,417,337.

(51) Int. Cl.
G10L 15/22    (2006.01)
G06N 20/00    (2019.01)

(52) U.S. Cl.
CPC .............. *G10L 15/22* (2013.01); *G06N 20/00* (2019.01)

(58) Field of Classification Search
CPC ..... G10L 15/22; G10L 15/1822; G06N 20/00; H04L 67/22
See application file for complete search history.

(56) References Cited

U.S. PATENT DOCUMENTS

| | | | |
|---|---|---|---|
| 6,628,835 B1 | 9/2003 | Brill et al. | |
| 8,254,535 B1 | 8/2012 | Madhavapeddi et al. | |
| 10,586,237 B2 | 3/2020 | Coughlin et al. | |
| 11,272,011 B1 | 3/2022 | Laughton et al. | |
| 2004/0111479 A1 | 6/2004 | Borden et al. | |
| 2009/0318777 A1 | 12/2009 | Kameyama | |
| 2010/0114556 A1* | 5/2010 | Meng | G10L 13/08 704/E17.001 |
| 2016/0110422 A1* | 4/2016 | Roytman | H04M 7/00 706/12 |
| 2016/0351206 A1 | 12/2016 | Gelfenbeyn et al. | |

(Continued)

FOREIGN PATENT DOCUMENTS

WO    2017/112813 A1    6/2017

OTHER PUBLICATIONS

"Dialogue as Dataflow: A new approach to conversational AI," Microsoft Research Blog, accessed at https://www.microsoft.com/en-us/research/blog/dialogue-as-dataflow-a-new-approach-to-conversational-ai/, Sep. 21, 2021, pp. 14.

*Primary Examiner* — Paras D Shah
*Assistant Examiner* — Oluwadamilola M Ogunbiyi
(74) *Attorney, Agent, or Firm* — Invoke

(57) ABSTRACT

Techniques for initiating system actions based on conversational content are disclosed. A system identifies a first conversational moment type. The first conversational moment type is defined by a first set of one or more conversational conditions. The system receives a user-selected action to be performed by the system in response to detecting conversational moments of the first conversational moment type. The system stores the user-selected action in association with the first conversational moment type. The system performs the user-selected action in response to detecting the conversational moments of the first conversational moment type.

20 Claims, 6 Drawing Sheets

(56) References Cited

U.S. PATENT DOCUMENTS

| | | |
|---|---|---|
| 2017/0140755 A1 | 5/2017 | Andreas et al. |
| 2017/0180276 A1 | 6/2017 | Gershony et al. |
| 2018/0025730 A1* | 1/2018 | Giletti .................... G10L 25/84 |
| | | 704/246 |
| 2018/0046710 A1* | 2/2018 | Raanani ................ G10L 15/183 |
| 2018/0307674 A1 | 10/2018 | Akkiraju et al. |
| 2019/0034522 A1* | 1/2019 | Kim .................... G06F 16/3329 |
| 2019/0037081 A1* | 1/2019 | Rao ..................... H04M 7/0078 |
| 2019/0066660 A1 | 2/2019 | Liang et al. |
| 2019/0087404 A1 | 3/2019 | Scheur et al. |
| 2019/0206399 A1* | 7/2019 | Garmark ................ G11B 27/11 |
| 2019/0266999 A1 | 8/2019 | Chandrasekaran et al. |
| 2020/0051585 A1* | 2/2020 | Guazzi ................... G10L 25/18 |
| 2020/0111377 A1* | 4/2020 | Truong .................. G10L 15/26 |
| 2020/0227026 A1 | 7/2020 | Rajagopal et al. |
| 2020/0320976 A1* | 10/2020 | Kawano ................. G10L 15/04 |
| 2020/0351374 A1* | 11/2020 | Eberle ..................... G06F 21/31 |
| 2020/0363920 A1* | 11/2020 | Ignatyev ............. G06F 16/2228 |
| 2020/0388271 A1 | 12/2020 | Dunn et al. |
| 2021/0158811 A1 | 5/2021 | Di et al. |
| 2021/0174805 A1 | 6/2021 | Wang et al. |
| 2021/0216720 A1 | 7/2021 | Rao et al. |
| 2021/0233534 A1* | 7/2021 | Nadig .................... G06F 40/30 |
| 2021/0287683 A1 | 9/2021 | Nareddy et al. |
| 2021/0334068 A1* | 10/2021 | Rangaraju ........... G06F 3/04817 |
| 2021/0350385 A1 | 11/2021 | Ellison et al. |
| 2021/0406718 A1* | 12/2021 | Hall ........................ G06F 40/35 |
| 2022/0103693 A1* | 3/2022 | Akiba ................. G06Q 30/016 |
| 2022/0392272 A1* | 12/2022 | Huang ................ B60R 16/0232 |

\* cited by examiner

INITIATING CONVERSATION MONITORING SYSTEM ACTION BASED ON CONVERSATIONAL CONTENT

INCORPORATION BY REFERENCE; DISCLAIMER

Each of the following applications are hereby incorporated by reference: application Ser. No. 17/400,915 filed on Aug. 12, 2021. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to presenting an interface for configuring a conversation analysis system to perform actions in response to detecting an occurrence of a set of conditions corresponding to a conversation.

BACKGROUND

In a variety of contexts, customer support functions (e.g., sales, marketing, complaint resolution, informational query) may rely on any of a variety of tools to improve the quality and speed of interactions with customers. For example, agents in a call center may have paper or electronically stored scripts that may be used in appropriate circumstances. Scripts may identify typical words, phrases, and sentence structures a customer support agent may encounter in a conversation. The scripts may provide recommended responses to the identified words, phrases, and sentence structures.

Despite uniform scripts and convenient response mechanisms, the current suite of tools used by most call centers can be inadequate. Generating recommended responses may be labor intensive and time consuming. An application developer must identify each known word, phrase, or sentence structure and create each recommended response for the agent.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
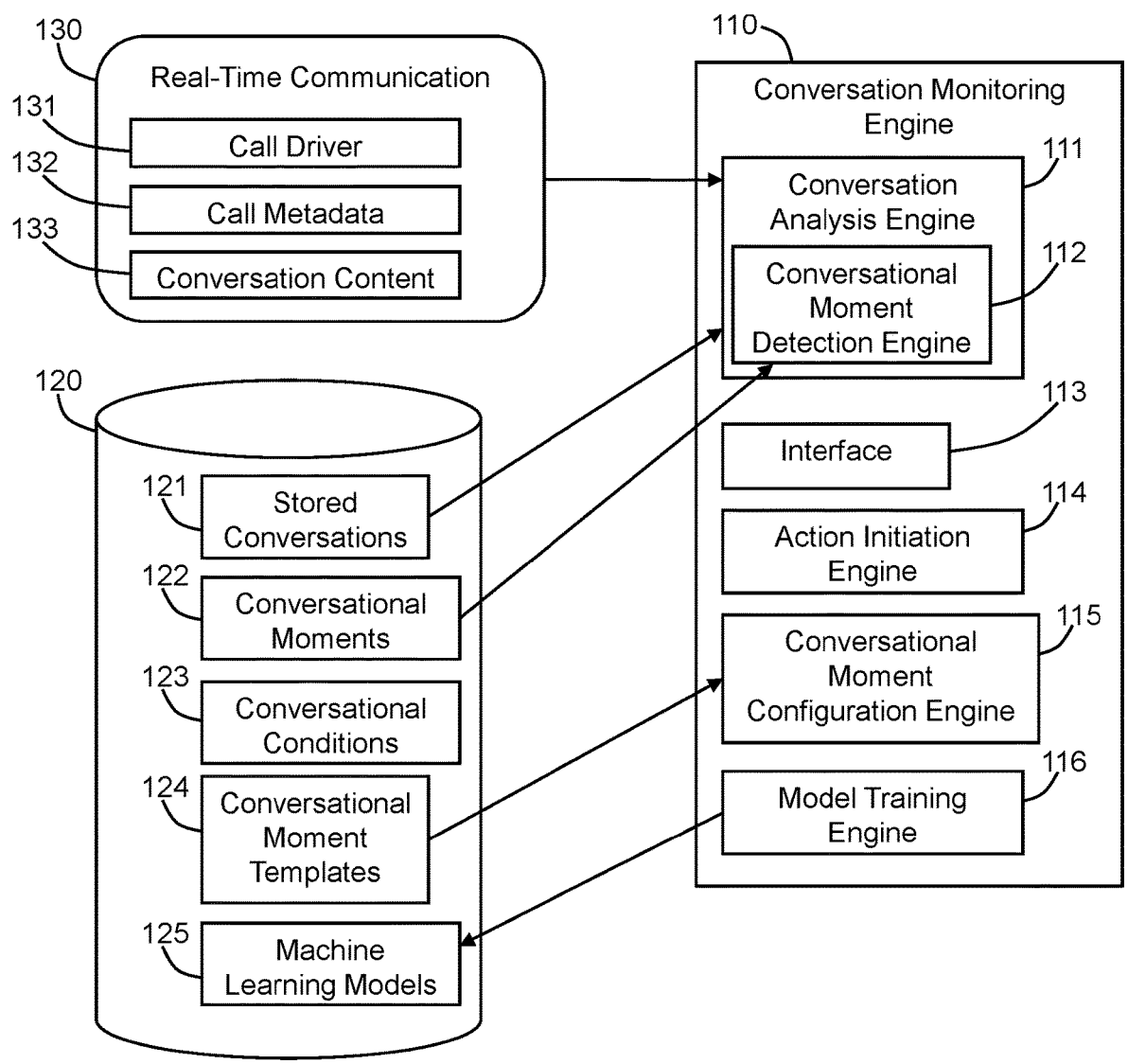
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
    2. SYSTEM ARCHITECTURE
    3. CONFIGURING CONVERSATION MONITORING SYSTEM ACTIONS BASED ON CONVERSATIONAL MOMENTS
    4. MACHINE LEARNING MODEL TRAINING
    5. EXAMPLE EMBODIMENT OF USER INTERFACE
    6. COMPUTER NETWORKS AND CLOUD NETWORKS
    7. MISCELLANEOUS; EXTENSIONS
    8. HARDWARE OVERVIEW

1. GENERAL OVERVIEW

Enterprises in many different industries provide customer support agents with computer-based tools to converse with customers. In one or more embodiments, a conversation monitoring system identifies various sets of conditions as "conversational moments" for which actions may be configured. Both moments and actions may be defined via a user interface, and/or an API. Actions are executed by a system in response to detecting a particular conversational moment. The conversational conditions may refer to currently detected conditions or conditions that have been detected at same preceding point-in-time during the conversation.

Conversational moments are defined semantic units made up of one or more conversational conditions. For example, a system may analyze a conversation to identify the conversational moment of a conversational moment type "objection" in which a customer raises an objection or concern. In another example, the system may identify an "intent" conversational moment, in which a customer or agent expresses, verbally or non-verbally, an intent to perform an action. Other examples of conversational moments, each defined by sets of verbal or non-verbal conversational conditions, include "emotion," such as anger or excitement, "product inquiry," in which a customer may call in on a product-inquiry telephone line (non-verbal conversational condition) or ask for information about a product (verbal conversational condition), and "talk speed," in which the system determines how fast a customer or agent is speaking. In the present specification, the term "verbal conversation" refers to both vocal conversation, such as via a telephone connection, and electronic conversation, such as an electronic chat conversation. While customer conversations associated with different industries may share some common types of conversational moments, the conversational conditions for the conversational moments may vary according to the industry. For example, a conversational moment "product inquiry" in one industry may include a customer question, "tell me about product X," while the conversational moment "product inquiry" in another industry may include a selection by a customer of an icon on a web page associated with a product Y. A system developer would benefit from a customizable system to allow users in different enterprises to configure a conversation monitoring system with enterprise-specific conversational moments.

One or more embodiments include receiving a user-selected action to be performed by a system in response to detecting a conversational moment. The system stores the action in association with the conversational moment. The system then performs the action based on detecting the conversational moment in a conversation. The conversation may be monitored in real-time or may be a stored conversation.

In one or more embodiments, a conversational condition defining a conversational moment may include a particular phrase being detected in a conversation, a period of silence being detected in the conversation, a speed of conversation, a non-verbal action performed by a participant in the conversation, and a number of repetitions of a condition. For example, a system may identify a conversational moment by determining that a number of repetitions of a conversational condition has exceeded a threshold.

In one or more embodiments, a conversational condition or a conversational moment may be correlated with a particular outcome of a conversation. For example, the system may define a conversational moment type "interruption" as detecting agent speech that overlaps customer speech. The system may associate the conversational moment type "interruption" with a failure condition of a call. The system may further allow for the combination of multiple conversational moments to configure a compound conversational moment. For example, the system may define a particular compositional moment as a repetition of three "interruption" conversational moment types. The system may associate the particular compound conversational moment with a failure of a call. In other words, the system may determine that when the particular compositional moment is detected, the agent is less likely to achieve the objective of the call, such as making a sale or obtaining a high level of customer satisfaction. In one or more embodiments, the system performs or recommends an action to increase the likelihood of success of a call, such as providing an example script for closing a sale, or providing an alert to a supervisor to increase customer satisfaction.

In one or more embodiments, the system allows for the customization of conversational moment types using conversational moment templates. A conversational moment template may include a name, such as "objection," and one or more fields configurable by a user to customize the objection. For example, the user may select one or more phrases that, when detected, will trigger detection of the "objection" conversational moment. In addition, the user may select one or more phrases that, when detected, will not trigger detection of the "objection" conversational moment. Conversational moment templates may be provided to a user to customize conversational moment detection for a particular system. For example, a first set of conversational moment templates may be common across an industry or across multiple industries and may require no modification by a user. The user may provide the conversational moment template to a conversation monitoring engine without modification to detect conversational moment types associated with the template. A second set of conversational moment templates may require some configuration by a user. For example, a conversational moment template may require that a user provide five positive examples, and five negative examples, of the conversational moment type prior to providing the conversational moment template to the conversation monitoring engine. A third set of conversational moment templates may be configured based on detected parameters. For example, a "silence"-type moment may include a float number parameter that is a numerical value representing a minimum length of silence in the conversation for detecting the moment. A fourth set of conversational moment templates may utilize fine-tuning using a machine learning model as the conversational moment template is applied to conversations over time. For example, a user may provide an initial set of example conditions defining the conversational moment template. A model training engine may train a machine learning model based on the initial set of example conditions. A conversational moment detection engine may detect instances of the conversational moment type in a conversation and may provide the detected instances to a user via a graphical user interface (GUI). The user may label the detected instances as correct or incorrect. The model training engine may re-train the machine learning model based on the user feedback.

In one or more embodiments, a conversational moment includes a name and a type. A system uses both the name and the type to check a dialogue program prior to real-time execution. If a trigger rule in the dialogue program uses an undefined conversational moment name, the system detects an error. A moment engine detects conversational moments in a conversation. The conversational moments include the properties: (a) name, (b) data, and (c) timestamp. The "data" includes the content of the conversation that follows the conversational moment type.

In one or more embodiments, the system trains a machine learning model to identify conversational moments in a conversation. The system obtains a set of positive example conversational conditions. The system may also obtain a set of negative example conversational conditions. A machine learning model is trained using the example conversational conditions to recommend additional conversational conditions that would define the conversational moment. The system may obtain user feedback for the recommended additional conversational conditions. The system may then re-train the model based on the user feedback.

In one or more embodiments, a conversational moment detection engine discovers new moments in a conversation. The conversational moment detection engine may select segments of the conversation—including verbal and non-verbal events—for which the moments engine is uncertain of an applicable moment. The segments may be provided to a user for labeling. Labeling may include providing, by a user: (a) a moment name, (b) a moment type, and (c) one or more additional positive and/or negative examples of the conversational moment. The conversational moment detection engine may generate a new conversational moment template based on the user feedback. Alternatively, the conversational moment detection engine may provide the conversation segment to the user with a recommended moment template. The user may provide feedback indicating whether the suggested conversational moment applies or whether to create a new conversational moment template associated with the conversation segment. The conversational moment detection engine may generate a feedback loop in which (a) the conversational moment detection engine provides a user with examples of a conversational moment from a conversation, (b) the user labels the examples as correct or incorrect, and (c) based on the user feedback, the conversational moment detection engine obtains and displays another set of examples from the conversation.

The conversational moments may be configurable via a graphical user interface (GUI). The GUI may include an interactive field including a list of conversational moment templates. Selection of a template may result in the GUI displaying interactive fields for selecting or generating conversational conditions to define a user-customized conversational moment. The interactive fields may further include a field for selecting or generating a system action.

In one or more embodiments, a conversation monitoring engine maps a conversation into a sequence of conversational moments. The conversation monitoring engine may display the sequence of conversational moments as a sequence of nodes in a dialogue graph. Using the GUI, a user may interact with any of the nodes in the dialogue graph to select, view, and modify the conversational moments. For example, a user may change a conversational moment type applied to a particular conversational segment. In addition, a user may identify and label a compound conversational moment comprising two or more of the nodes in the dialogue graph.

In the present specification and claims, the term "conversational moment" does not necessarily define the term "moment" as a brief period of time.

One or more embodiments described in this Specification and/or recited in the claims may not be included in this General Overview section.

2. SYSTEM ARCHITECTURE

A data monitoring system obtains data from multiple sources in multiple different formats and having different granularity. The data monitoring system analyzes the data for quality and provides a uniform measure of data quality to a user.

FIG. 1 illustrates a system 100 in accordance with one or more embodiments. As illustrated in FIG. 1, system 100 includes a conversation monitoring engine 110 and a data repository 120.

The conversation monitoring engine 110 includes a conversation analysis engine 111, interface 113, action initiation engine 114, conversational moment configuration engine 115, and model training engine 116.

The conversational moment definition engine 115 retrieves one or more conversational moment templates 124 from the data repository 120. A user may interact with the user interface 113 to generate a user-defined conversational moments 122 based on the conversational moment templates 124. The conversational moment configuration engine 115 provides user interface elements to allow a user to associate a system action—such as displaying particular scripts or product information, generating a notification to one or more agents or supervisors, prediction of a success or failure of a conversation—with the user-customized conversational moment.

The conversation analysis engine 111 analyzes a conversation to identify conversational moments. For example, the conversational analysis engine 111 may monitor a real-time communication 130. Monitoring the real-time communication 130 may include identifying both verbal and non-verbal content. For example, the conversation analysis engine 111 may identify a call driver 131, or data identifying why a call was initiated. For example, the conversation analysis engine 111 may identify a customer request for product information as the call driver. Alternatively, the conversation analysis engine 111 may identify an enterprise-initiated follow-up call to a potential customer as the call driver. An enterprise may have particular phone numbers associated with particular call drivers—such as an account set-up phone number, a customer support phone number, and a sales phone number. The system may refer to the phone numbers to identify the call driver. Alternatively, or in addition, different agents may have different roles. When a call is initiated by an agent, the system may use an agent identifier to determine a call driver. Any information indicating the purpose of the conversation may be included as a call driver 131. The conversation analysis engine 111 may identify additional call metadata 132. Call metadata 132 may include, for example: a start time of the call, a duration of the call, a timestamp within the call, call quality information (such as whether a call connection is poor), computer access information identifying files, information collected by an interactive voice response (IVR) system, information collected by a bot system, documents, or applications accessed by an agent during the call. The conversation analysis engine 111 may further identify conversation content 133, including words, phrases, sentences, sentence structures, linguistic patterns, pauses or silence, or any other conversation content. In addition, or in the alternative, the conversation analysis engine 111 may analyze a stored conversation 121. Similar to the real-time communication 130, the stored conversation 121 may include call driver information, call metadata information, and conversation content information.

The conversation analysis engine 111 includes a conversational moment detection engine 112. The conversational moment detection engine 112 detects conversational moments 122 in conversations. The conversational moments 122 are made up of sets of one or more conversational conditions 123. As the conversational moment detection engine 112 analyzes a conversation, it identifies sets of conversational conditions within the conversation—such as sets or combinations of words and metadata—that define conversational moment types 122. The conversational moment detection engine 112 identifies one or more actions associated with a detected conversational moment. The action initiation engine 114 initiates the action specified by the detected conversational moment. Example actions include: (a) displaying a pre-generated script, (b) generating a prediction of a success or failure of a conversation, (c) displaying pre-defined information associated with the conversation, such as customer information or product information, (d) generating an alert—for an agent, supervisor, or other entity, (e) generating a timestamp in a recording of a conversation, (f) generating a hint for an action to be taken by an agent, (g) generating a checklist, such as a list of required items or actions to be performed, or (h) providing a link to an informative article related to a subject of the conversation. In one or more embodiments, users may customize actions. For example, a developer may build a widget that appears on a display device of an agent in real-time during a conversation. The developer may create a custom action that triggers the widget based on the conversational moment detection engine detecting a conversational moment in the conversation.

The model training engine 116 trains one or more machine learning models. For example, one machine learning model identifies conversational moments in a conversation. Additional machine learning models include: (a) a model to determine a set of actions to suggest for a particular conversational moment, (b) a model to determine a set of key moments associated with a particular conversational outcome, such as a success or failure of a conversation, and (c) a model to determine which conversational moment templates to associate with particular actions. The trained machine learning models 125 are stored in the data repository 120. The machine learning models may be used by the conversation analysis engine 111 to identify conversational moments and to provide predictions of the success or failure of conversations. In addition to the predictions of the success or failure of conversations, the machine learning models 125 may provide suggestions for actions to change a conversation prediction from failure to success.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

In one or more embodiments, a data repository 120 is any type of storage unit and/or device (e.g., a file system, database, collection of tables, or any other storage mechanism) for storing data. Further, a data repository 120 may include multiple different storage units and/or devices. The multiple different storage units and/or devices may or may not be of the same type or located at the same physical site. Further, a data repository 120 may be implemented or may execute on the same computing system as the data monitoring system 120. Alternatively, or additionally, a data repository 120 may be implemented or executed on a computing system separate from the data monitoring system 120. A data repository 120 may be communicatively coupled to the data monitoring system 120 via a direct connection or via a network.

In one or more embodiments, the data monitoring system 120 refers to hardware and/or software configured to perform operations described herein for analyzing and presenting data. Examples of operations for analyzing data from multiple sources, normalizing the analyzed data, and providing a user interface to aid a user in understanding the analyzed data are described below with reference to FIG. 2.

In an embodiment, the data monitoring system 120 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, interface 113 refers to hardware and/or software configured to facilitate communications between a user and the conversation monitoring engine 110. The interface 113 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 113 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 113 is specified in one or more other languages, such as Java, C, or C++.

3. CONFIGURING CONVERSATION MONITORING SYSTEM ACTIONS BASED ON CONVERSATIONAL MOMENTS

Figure 2:
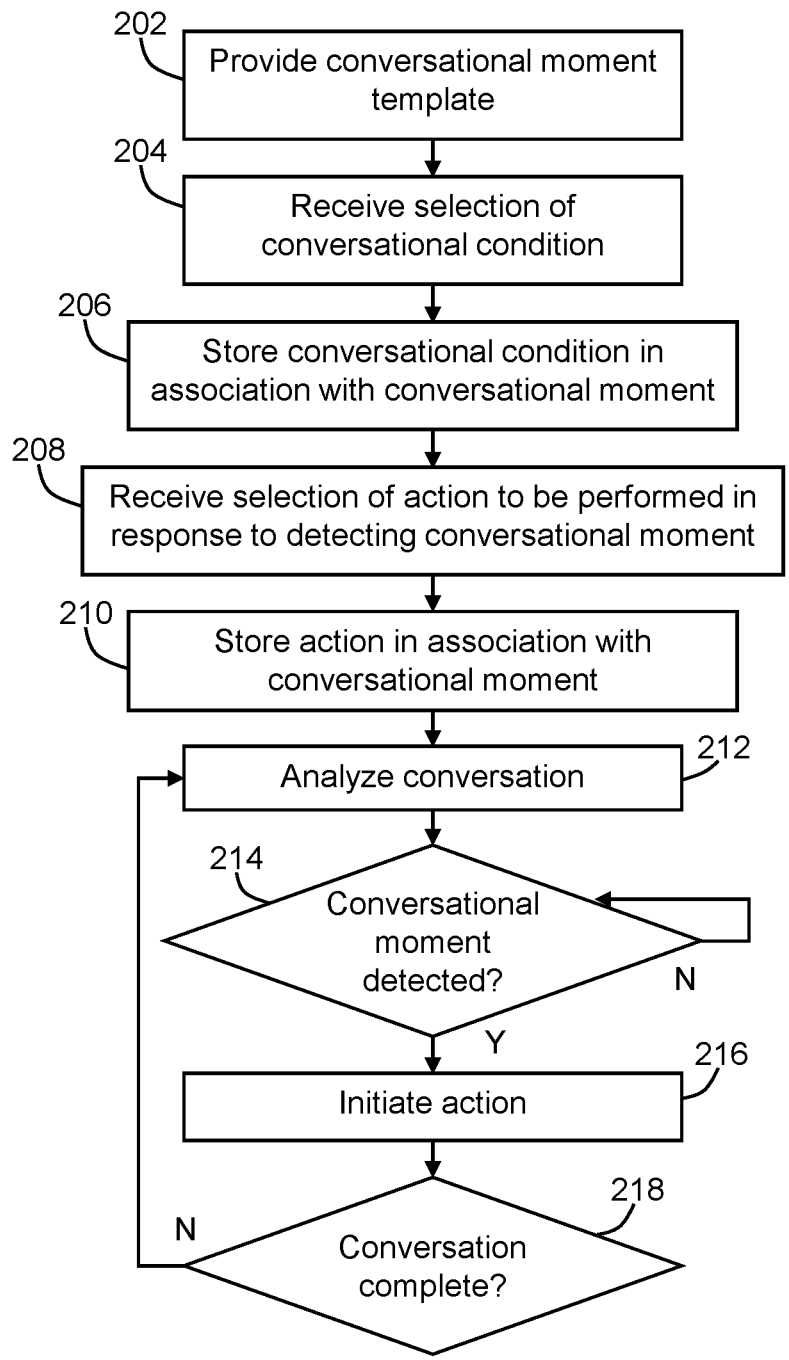
FIG. 2 illustrates an example set of operations for in accordance with one or more embodiments.

FIG. 2 illustrates an example set of operations for normalizing multiple types of data analyses in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system provides user with a conversational moment type template (Operation 202). The conversational moment type may include, for example: a preliminary name identifying a conversational moment type; one or more template conversational conditions, conversational condition types, or fields for selecting conversational conditions; and one or more template actions, action types, or fields for selecting actions to be associated with the user-customized conversational moment type. In one embodiment, providing a conversational moment type template includes identifying an application programming interface (API) function that returns all pre-defined moment types.

The system receives one or more conversational conditions (Operation 204). For example, in an embodiment in which the conversational moment type template is an "objection" type template, a GUI may display a list of example phrases that commonly correspond to a customer objection. For example, the GUI may display phrases including: "costs too much," "I don't need," "I'm not sure," or "not interested." The example phrases may be selectable by a user and further customizable by the user. For example, a user may modify a displayed phrase to include a specific product name or price range based on a particular product sold by a particular enterprise.

The system stores the received conversational condition in association with the conversational moment type (Operation 206). The system may allow a user to combine multiple conversational conditions into one conversational moment type. The conversational conditions may be different examples of the same conversational moment type, such as different phrases that are all identified "objections." In addition, the conversational conditions may include examples that are negative examples of the conversational moment type. For example, the system may store the phrase "I'm not sure" as a positive example of an objection-type conversational moment type and the phrase "let me think about this" as a negative example of the objection-type conversational moment type. Negative examples are examples that the system does not classify as being of the specified conversational moment type.

In one or more embodiments, the system stores two or more conversational moment types in association with another conversational moment type, referred to herein as a compound conversational moment type. For example, a conversational moment type "closing the sale" may be made up of a conversational moment type "name the price" in which the system identifies words by an agent that give a price to a customer, followed by a conversational moment type "intent to buy" in which the system detects a word or phrase by a customer indicating approval of the named price, such as "that sound's good."

In one embodiment, the system provides or executes an API function to accept conditions for a particular moment type. For example, an API function for one moment type may specify a combination of: (1) a set of words, and (2) at least one agent action. An API function for another moment type may specify only a set of words, only a particular agent action, or only a particular class of metadata.

In one or more embodiments, the system trains a machine learning model, using a pre-defined and/or user-selected set of conversational conditions for a particular conversational moment type, to identify additional conversational conditions to be associated with the particular conversational moment type. For example, a user may select three phrases in a conversation to define a conversational condition for "angry." The machine learning model may identify other phrases in one or more conversations that are also candidates for the conversational moment type "angry." For example, the machine learning model may identify a correlation between the three user-selected phrases and a subsequent customer-hanging-up conversational condition. The system may identify additional words or phrases in one or more stored conversations that also are correlated with a customer-hanging-up conversational condition. The system may provide the identified words or phrases to the user as recommendations for defining the "angry" conversational moment. The system may then re-train the machine learning model based on the user feedback.

The system receives a selection of an action to be performed in response to detecting a conversational moment (Operation 208). In one embodiment, the system assigns a default action to a conversational moment. In addition, or in the alternative, the system may allow user to select, modify, or add an action to a conversational moment. Example actions include providing an example script for an agent, displaying data related to a conversation—such as product data, and generating a prediction of a success or failure of a conversation.

In one embodiment, the system provides or executes an API function to accept actions for a particular conversational moment type. The system may identify and store different types of commands. Commands defined by the API accept arguments for configuring actions to be performed in response to detecting conversational moments of the conversational moment type. For example, the API may define a command accepting a name of a conversational moment type and one or more predefined actions.

The system stores the selected action in association with the conversational moment type (Operation 210). Consequently, when the system detects the conversational moment in a conversation, the system initiates the corresponding action that has been stored in association with the conversational moment type. In one embodiment, storing the action in association with a conversational moment type includes exposing an application programming interface (API) that allows for the user-selected action to be performed by the system in response to detecting the associated conversational moment.

The system analyzes a conversation (Operation 212). The system may analyze a real-time conversation or a previously-stored conversation. The analyzed conversation may include verbal and non-verbal characteristics associated with the conversation. For example, the system may analyze words, phrases, sentences, voice tone, and word speed within a conversation to identify sets of words, a tone of a conversation, an intent of a participant, or an emotion of a participant. In addition, the system may analyze metadata associated with the conversation and agent interactions with a computing system or computer application before, during, or after the conversation.

The system determines whether a conversational moment is detected (Operation 214). The system may determine if the conversational conditions that define the conversational moment are present in the words of the conversation and/or the metadata or agent actions. As an example, the system may detect the words "tell me about your product" together with a search by an agent for a product of a particular name. The words and the agent action may each correspond to conversational conditions or sub-moments. For example, the words, alone may correspond to a conversational moment type "product curiosity." The agent search, alone, may correspond to a conversational moment type "product search." The detected conversational moment (e.g., "interested in product") may be defined by the combination of the conversational sub-moments "product interest" and "product search."

In one embodiment, detecting a conversational moment includes detecting a pre-defined period of silence in a conversation. For example, one conversational moment may include a first sub-moment of a user-initiated question followed by a second sub-moment of a period of silence. Such a conversational moment may be associated with an action prompting the agent to reply to the customer. Another conversational moment may include a first sub-moment of an agent-initiated question followed by a second sub-moment of a period of silence. This conversational moment may be associated with a visual prompt to the agent to refrain from commenting until the customer has replied.

The system initiates an action corresponding to the identified conversational moment type (Operation 216). For example, in the above example in which the conversational moment type "interested in product" is made up of two sub-moments, the system may initiate a predefined action of displaying product information. For example, the system may display product specification before the agent has completed entering search terms. As another example, the system may generate a list of products that may be of interest to the customer based on a general reference to a product in a conversation. As another example, the system may generate both a specific product identified in the conversation as well as related products.

The system determines if the conversation has ended (Operation 218). If the conversation has not ended, the system continues to analyze the conversation to detect additional conversational moments.

4. MACHINE LEARNING MODEL TRAINING

Figure 3:
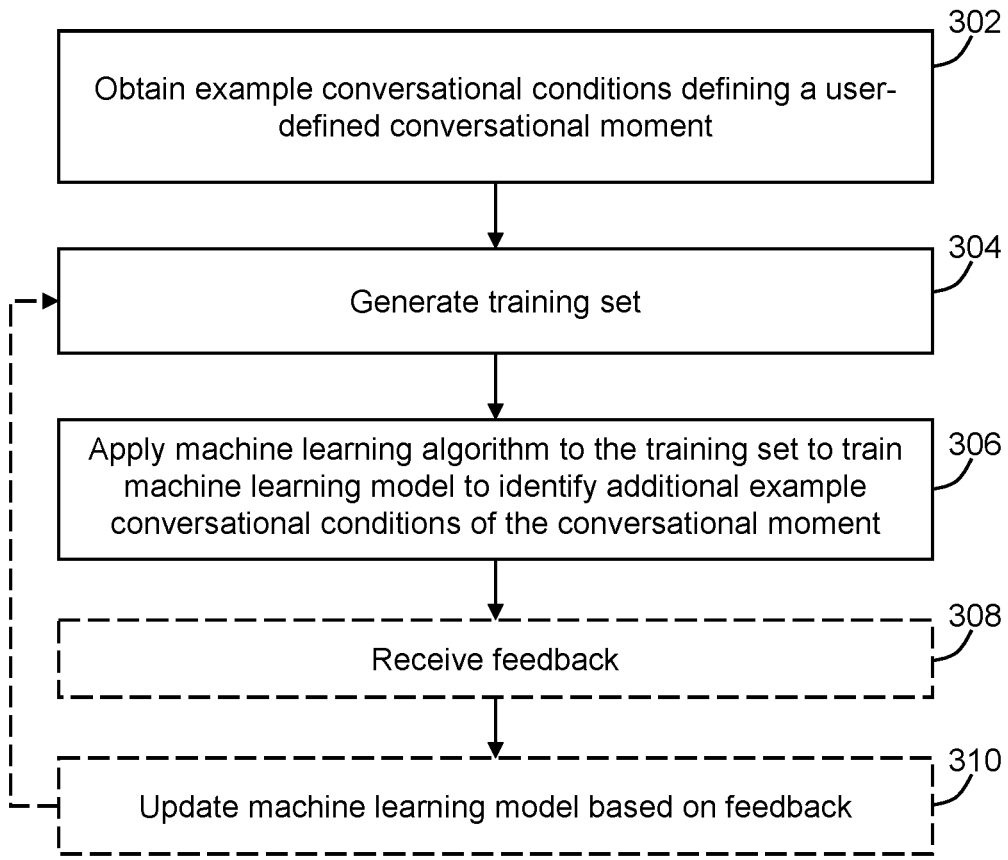
FIG. 3 illustrates an example set of operations for training a machine learning model in accordance with one or more embodiments.

FIG. 3 illustrates an example set of operations for training a machine learning model in accordance with one or more embodiments. One or more operations illustrated in FIG. 3 may be modified, rearranged, or omitted all together.

Accordingly, the particular sequence of operations illustrated in FIG. 3 should not be construed as limiting the scope of one or more embodiments.

A system obtains an example set of conditions that define a conversational moment type (Operation 301). The set of conditions includes, for example, one or more of: (1) words, phrases, or sentences in a conversation, (2) metadata associated with the conversation, and (3) actions by a participant in connection with the conversation, such as an agent accessing a computer application during the conversation. The set of conditions may include both positive examples that exemplify the conversational moment type, and negative examples that do not exemplify the conversational moment type.

The system generates a training data set using the example conditions (Operation 304). The training data set includes a set of example conversational conditions associated with a particular conversational moment type. The example conversational conditions may be sub-moments of a compositional moment. For example, a conversational moment type "Account Set-Up Support" may include a sub-moment "Call Driver: Call Originating From Account Set-Up Phone Number" defined by call metadata conversational conditions and a sub-moment "Customer Request: Account Set-Up" defined by phrases or sentences uttered by a customer in a conversation.

The system applies a machine learning algorithm to the training set to train a machine learning model to identify additional examples of a conversational conditions associated with a particular conversational moment type (Operation 306). For example, if a user provides eight example conversational conditions of a particular conversational moment type, the machine learning model may apply the machine learning model to a conversation to generate a ninth example, different from the eight examples, as a candidate example conversational condition for the conversational moment type. The system may display the ninth example in a user interface.

The system receives user feedback based on the candidate example generated by the machine learning model (Operation 308). For example, the feedback may indicate that the candidate example should be included as a positive example of a conversational condition associated with the conversational moment type. Alternatively, the feedback may indicate that the candidate example is not a positive example conversational condition of the conversational moment type. In one embodiment, if the feedback indicates that the candidate example is not a positive example of a conversational condition of the conversational moment type, the system may store the candidate example in association with the conversational moment type as a negative example conversational condition that does not exemplify the conversational moment type.

The system updates the machine learning model based on the feedback (Operation 310). For example, the machine learning model may initially identify a correlation between eight user-provided example conversational conditions of a conversational moment type and a particular event, such as a customer purchase of a product. The machine learning model may identify a particular phrase as a candidate example conversational condition of the conversational moment type based on a similar correlation with the event. However, if the user feedback is negative, the system may modify a model parameter representing a similarity between the candidate example and the user-provided examples.

5. EXAMPLE EMBODIMENT OF USER INTERFACE

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4:
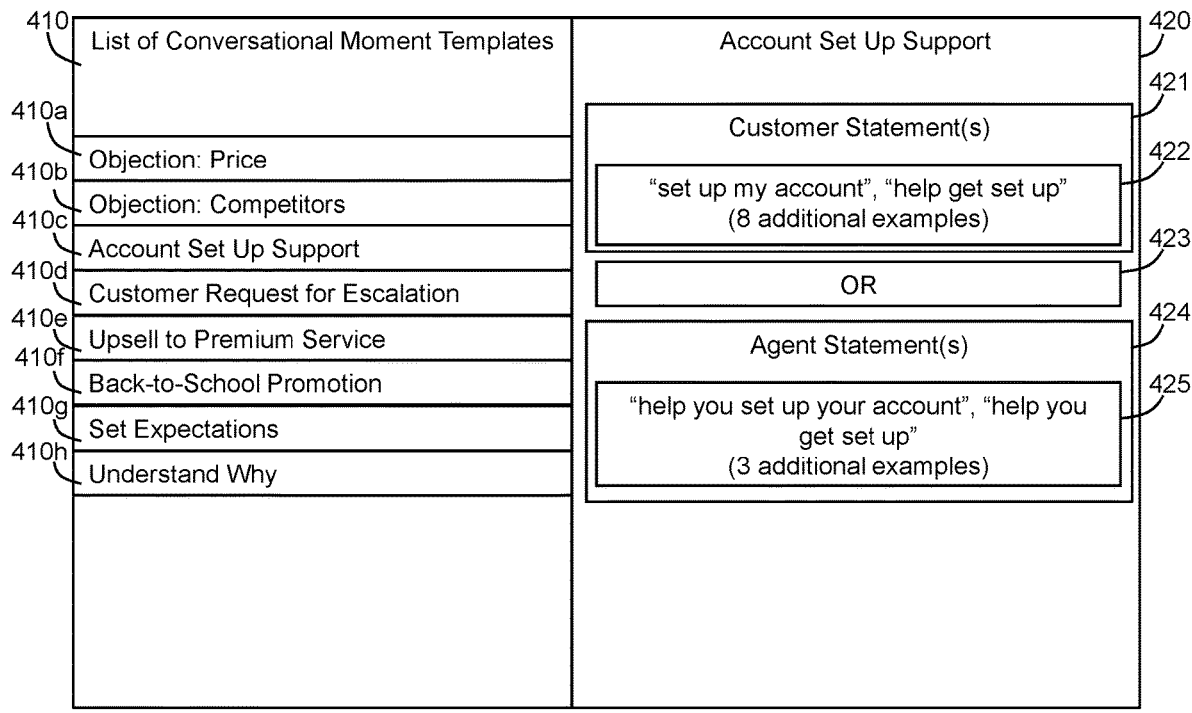
FIG. 4 illustrates an example of a graphical user interface (GUI) according to one or more embodiments.

FIG. 4 illustrates a graphical user interface (GUI) 400 of a conversational moment type customization screen according to one embodiment. The GUI 400 includes a panel 410 displaying a list of moment templates 410a-410h. In one embodiment, upon selection of one of the conversational moment type templates 410a-410h, the GUI 400 simultaneously displays a detail panel 420 including additional detail about a selected template. In the example in FIG. 4, a user has selected the account set up support template 410c. The detail panel 420 displays template conversational conditions. The account set-up support template 410c includes template customer statements 421: "set up my account," "help get set up," and additional examples. The examples are displayed in a field 422 that is selectable by a user to add, remove, or modify the template conversational conditions. The account set-up support template 410c includes template agent statements 424: "help you set up your account," "help you get set up," and additional examples. The examples are displayed in a field 425 that is selectable by a user to add, remove, or modify the template conversational conditions.

The detail panel 420 includes a field 423 for a logical operator. The logical operator specifies whether the system will recognize the user-generated conversational condition if either a specified customer statement or agent statement is detected, or only if both the customer statement and the agent statement are detected. In the example in FIG. 4, the "account set-up support" conversational condition would be detected if a specified customer statement OR a specified agent statement is detected. Upon receiving user modifications to the account set-up support template, the system may store the user-generated account-set up support conversational condition for conversation monitoring.

In one or more embodiments, the GUI 400 allows a user to combine two or more conversational moment type templates into a compound conversational moment type. For example, selection of the Understand why 410h conversational moment type may display conversational conditions associated with a sub-moment "Upset Customer" and the sub-moment "Customer Request for Escalation." The sub-moment "Upset Customer" may be defined by words, phrases, or tone reflecting agitation or anger, such as "I can't believe this." The sub-moment "Customer Request for Escalation" may be defined by phrases or sentences such as "I'd like to speak to your supervisor." The compound conversational moment type template "Understand Why" may include example actions, such as "alert supervisor to conversation," and "provide script to agent to identify why customer wants to speak to supervisor." The example actions may be customizable to modify whether the example action is included in the user-generated conversational moment type, whether additional actions are included, or whether the example action is modified.

Figure 5:
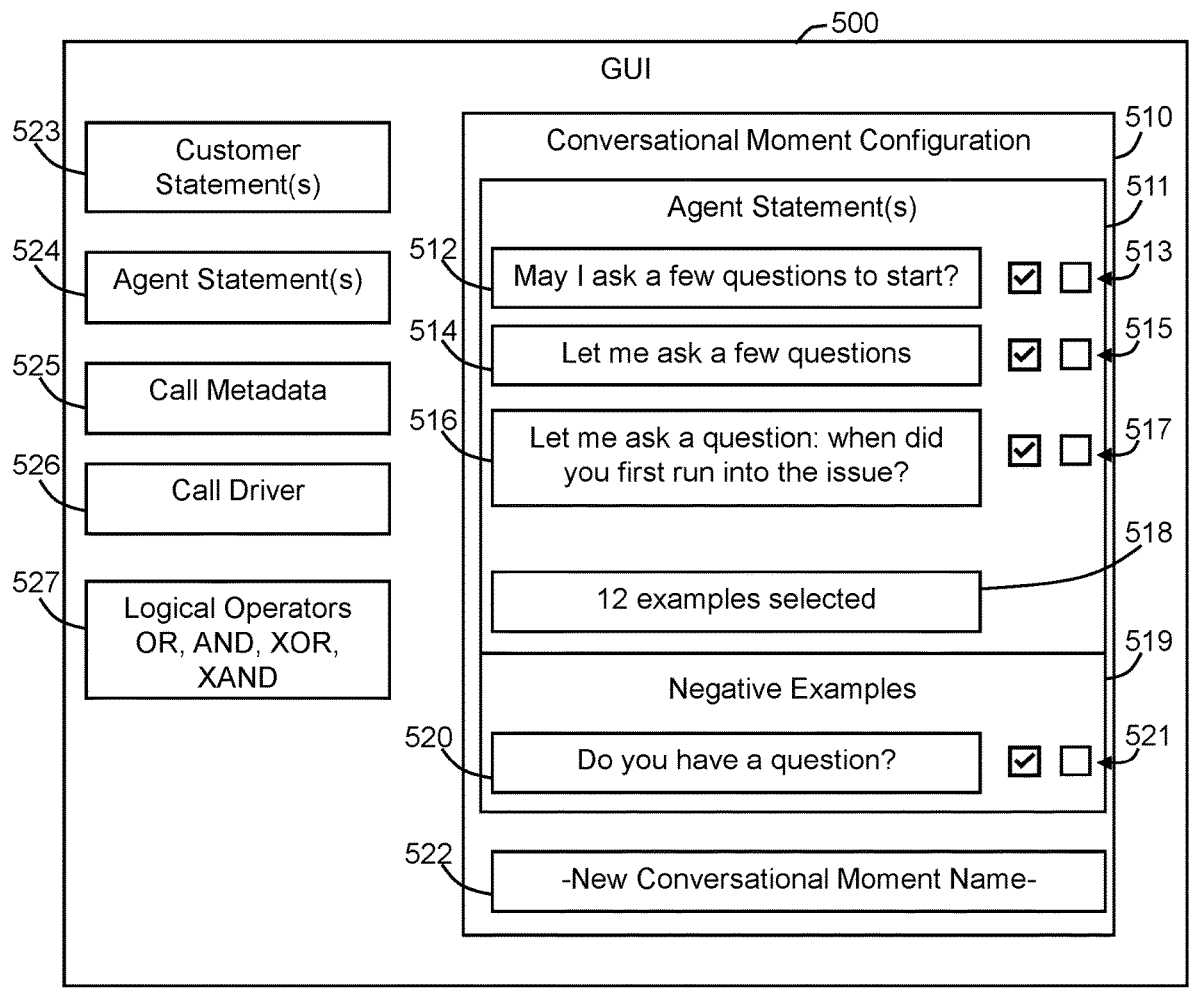
FIG. 5 illustrates an example of GUI in accordance with one or more embodiments.

FIG. 5 illustrates another graphical user interface (GUI) 500 according to one embodiment. The GUI 500 includes a conversational moment type configuration panel 510. The conversational moment type configuration panel 510 includes example conversational conditions 512, 514, 516, and 520. In the example illustrated in FIG. 5, the example conversational conditions 512, 514, and 516 are positive examples that exemplify the conversational moment type. The conversational condition 520 is a negative example that does not exemplify the conversational moment type. In other words, if the system monitoring a conversation detects the example 520, it would not trigger any action associated with the conversational moment type. The conversational moment type configuration panel 510 also includes a field 518 representing additional selected conversational conditions. The conversational conditions 512, 514, 516, and 520 are associated with a panel 511 "agent statement(s)." When the system is monitoring a conversation between a customer and an agent, the system detects the conversational moment when the system detects the agent saying the selected phrases or sentences.

Each example conversational condition 512, 514, 516, and 520 is associated with a selection interface element 513, 515, 517, and 521. In the example illustrated in FIG. 5, the selection interface element 513, 515, 517, and 521 is represented as a pair of boxes. Selection of one box results in the system including the selected conversational condition in the conversational moment type. Selection of the other box results in the system excluding the selected conversational condition from the conversational moment type.

The panel 510 also includes a field 522 editable by a user to provide a name for the conversational moment type.

In one or more embodiments, the set of conversational conditions 512, 514, 516, 520, and the additional selected examples 518, are used by a machine learning model training engine to train a machine learning model to identify additional conversational conditions to be associated with the conversational moment type. The system trains a machine learning model using the selected conversational conditions. The system applies the machine learning model to a conversation to identify additional conversational conditions—such as additional phrases or sentences—that the system recommends should correspond to the conversational moment type. A user may provide feedback to approve or disapprove the recommended conversational conditions. The system updates the machine learning model based on the user feedback.

The GUI 500 includes menu headers 523 ("Customer Statement(s)"), 524 ("Agent Statement(s)"), 525 ("Call Metadata"), and 526 ("Call Driver"). The menu headers 523, 524, 525, and 526 are selectable by a user. Selecting a menu header results in the system displaying example conversational conditions associated with the menu header. For example, selection of the Call Metadata menu header 525 results in the system displaying types of metadata, such as call duration, call timestamp, originating area code, agent number, etc. The displayed metadata may be selectable conversational conditions. Selection of the conversational conditions results in the system detecting the conversational moment upon detecting the selected metadata.

The GUI 500 further includes a "logical operators" interactive element 527. Selection of the "logical operators" interactive element 527 results in a selected logical operator being applied to two or more conversational conditions.

6. COMPUTER NETWORKS AND CLOUD NETWORKS

In one or more embodiments, a conversation monitoring engine may be embodied in a computer network that provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
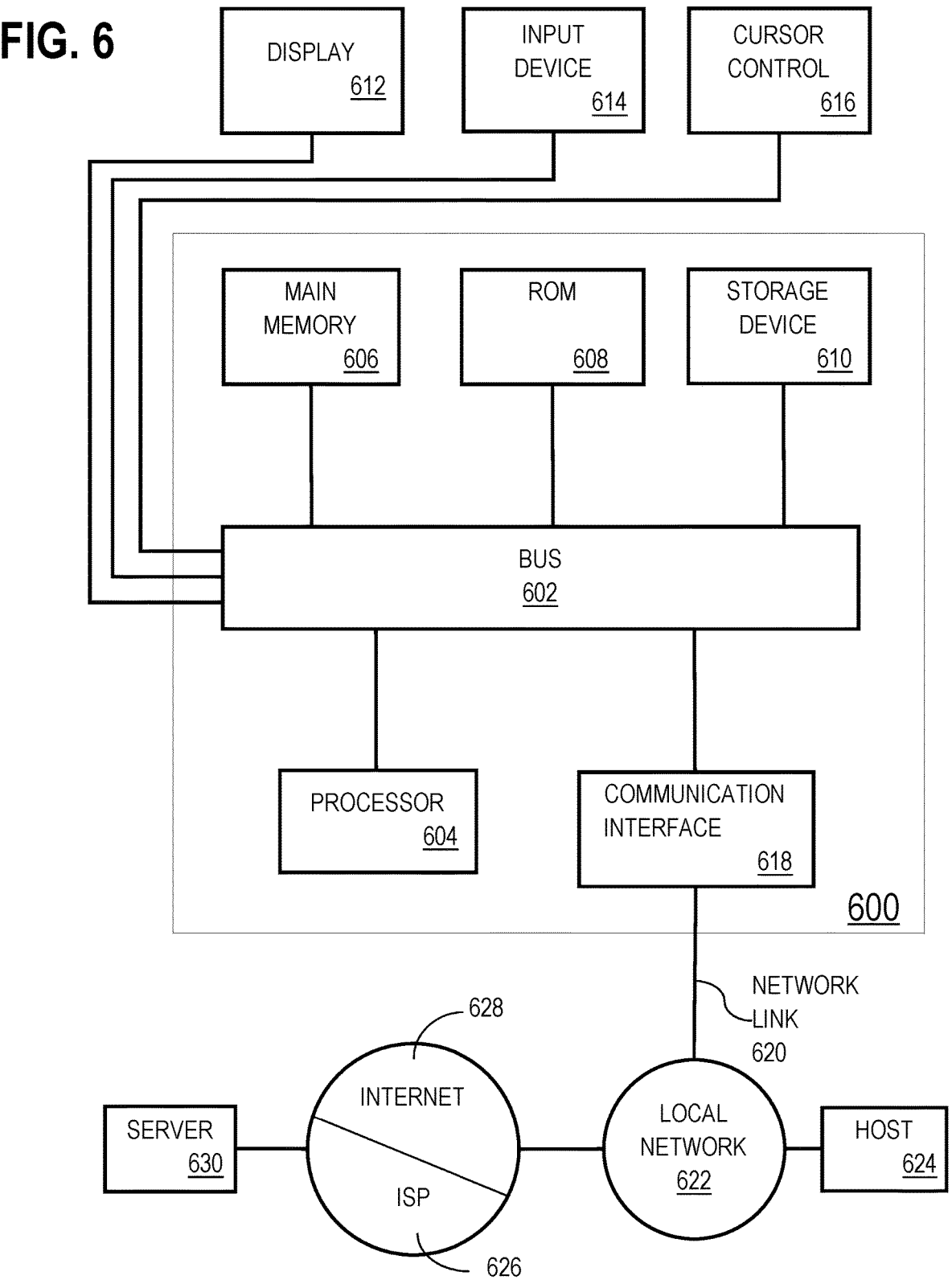
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    displaying, in a first portion of a graphical user interface (GUI), a set of conversational moment templates corresponding to a set of conversational moment types, wherein the set of conversational moment types is defined by a frequency at which a first set of one or more conversational conditions is detected, the frequency being based on a number of times the first set of one or more conversational conditions are detected within a particular period of time, the number of times being two or greater;
    detecting a selection of a first template, from among the set of conversational moment templates, corresponding to a first conversational moment type based on a first user interaction with the first template in the GUI;
    based on detecting the selection of the first template corresponding to the first conversational moment type, displaying, in a second portion of the GUI, the first set of one or more conversational conditions corresponding to the first conversational moment type;
    based on detecting a selection of (a) a second set of conversational conditions, from among the first set of one or more conversational conditions, and (b) an action to be performed by a system in response to detecting the second set of conversational conditions:
        generating first conversational moment configuration data storing the second set of conversational conditions and the action in association with a first conversational moment of the first conversational moment type; and
    configuring the system to perform the action in response to detecting the second set of conversational conditions in a monitored conversation.

2. The non-transitory computer readable medium of claim 1, wherein the operations further comprise:
    analyzing the monitored conversation; and
    responsive to detecting a first conversational moment of the first conversational moment type in the monitored conversation: executing the action.

3. The non-transitory computer readable medium of claim 1, wherein the operations further comprise:
    generating the first conversational moment type based on identifying a correlation between the frequency at which the first set of one or more conversational conditions is detected and a success or failure of the monitored conversation.

4. The non-transitory computer readable medium of claim 1, wherein the one or more conversational conditions comprise a particular phrase being detected in the monitored conversation.

5. The non-transitory computer readable medium of claim 1, wherein the one or more conversational conditions comprise a period of silence detected in the monitored conversation.

6. The non-transitory computer readable medium of claim 1, wherein the one or more conversational conditions comprise a non-verbal action performed by a participant of the monitored conversation being detected during the monitored conversation.

7. The non-transitory computer readable medium of claim 1, wherein determining the action to be performed by the system in response to detecting conversational moments of the first conversational moment type comprises exposing an application programming interface (API) function that allows for receiving a user-selected action to be performed by the system in response to detecting the conversational moments of the first conversational moment type.

8. The non-transitory computer readable medium of claim 1, wherein identifying the first conversational moment type includes receiving a selection of the first conversational moment type from among a plurality of conversational moment type templates,
    wherein the operations further comprise:
    displaying at least one conversational condition example associated with the first conversational moment type; and
    receiving a selection of the at least one conversational condition example to be included among the first set of one or more conversational conditions.

9. The non-transitory computer readable medium of claim 1, wherein the first set of one or more conversational conditions includes at least two conversational sub-moments; and
    the first conversational moment type specifies a logical operator associated with the at least two conversational sub-moments.

10. The non-transitory computer readable medium of claim 1, wherein the first conversational moment type is one of:
    an intent-type conversational moment defined by at least one first verbal or non-verbal conversational conditions associated with an intent of at least one participant in the monitored conversation;

an objection-type conversational moment defined by at least one second verbal conversational conditions associated with an objection raised by the at least one participant in the monitored conversation;

a workflow-type moment defined by at least one third non-verbal action performed by the at least one participant in the monitored conversation; and a sentiment-type moment defined by at least one fourth verbal conversational condition associated with a sentiment of the at least one participant in the monitored conversation.

11. The non-transitory computer readable medium of claim 1, wherein the first conversational moment type is a speed-type moment defined by at least one verbal conversational condition measuring a talking speed of at least one participant in the monitored conversation.

12. The non-transitory computer readable medium of claim 1, wherein the first set of one or more conversational conditions comprises:

a first positive conversational condition specifying first verbal or non-verbal content exemplifying the conversational moment; and a first negative conversational condition specifying second verbal or non-verbal content that does not exemplify the conversational moment.

13. A non-transitory computer readable medium comprising instructions which, when executed by one or more hardware processors, causes performance of operations comprising:

displaying, in a first portion of a graphical user interface (GUI), a set of conversational moment templates corresponding to a set of conversational moment types, wherein the set of conversational moment types is defined by a first set of one or more conversational conditions;

detecting a selection of a first template, from among the set of conversational moment templates, corresponding to a first conversational moment type based on a first user interaction with the first template in the GUI;

based on detecting the selection of the first template corresponding to the first conversational moment type, displaying, in a second portion of the GUI, the first set of one or more conversational conditions corresponding to the first conversational moment type;

based on detecting a selection of (a) a second set of conversational conditions, from among the first set of one or more conversational conditions, and (b) an action to be performed by a system in response to detecting conversational moments of the first conversational moment type at a particular frequency, the particular frequency being based on a number of times conversational moments of the first conversational moment type are detected within a particular period of time, the number of times being two or greater:

generating first conversational moment configuration data storing the action in association with a first conversational moment of the first conversational moment type; and configuring the system to perform the action in response to detecting the second set of conversational conditions in a monitored conversation.

14. A method comprising:

displaying, in a first portion of a graphical user interface (GUI), a set of conversational moment templates corresponding to a set of conversational moment types, wherein the set of conversational moment types is defined by a frequency at which a first set of one or more conversational conditions is detected, the frequency being based on a number of times the first set of one or more conversational conditions are detected within a particular period of time, the number of times being two or greater;

detecting a selection of a first template, from among the set of conversational moment templates, corresponding to a first conversational moment type based on a first user interaction with the first template in the GUI;

based on detecting the selection of the first template corresponding to the first conversational moment type, displaying, in a second portion of the GUI, the first set of one or more conversational conditions corresponding to the first conversational moment type;

based on detecting a selection of (a) a second set of conversational conditions, from among the first set of one or more conversational conditions, and (b) an action to be performed by a system in response to detecting the second set of conversational conditions:

generating first conversational moment configuration data storing the second set of conversational conditions and the action in association with a first conversational moment of the first conversational moment type; and configuring the system to perform the action in response to detecting the second set of conversational conditions in a monitored conversation.

15. The method of claim 14, further comprising:
analyzing the monitored conversation; and
responsive to detecting a first conversational moment of the first conversational moment type in the monitored conversation: executing the action.

16. The method of claim 14, further comprising:
generating the first conversational moment type based on identifying a correlation between the frequency at which the first set of one or more conversational conditions is detected and a success or failure of the monitored conversation.

17. The method of claim 14, wherein the one or more conversational conditions comprise a particular phrase being detected in the monitored conversation.

18. The method of claim 14, wherein the one or more conversational conditions comprise a period of silence detected in the monitored conversation.

19. The method of claim 14, wherein the one or more conversational conditions comprise a non-verbal action performed by a participant of the monitored conversation being detected during the monitored conversation.

20. A system, comprising:
one or more processors; and
memory storing instructions that, when executed by the one or more processors, cause the system to perform operations comprising:

displaying, in a first portion of a graphical user interface (GUI), a set of conversational moment templates corresponding to a set of conversational moment types, wherein the set of conversational moment types is defined by a frequency at which a first set of one or more conversational conditions is detected, the frequency being based on a number of times the first set of one or more conversational conditions are detected within a particular period of time, the number of times being two or greater;

detecting a selection of a first template, from among the set of conversational moment templates, corresponding to a first conversational moment type based on a first user interaction with the first template in the GUI;

based on detecting the selection of the first template corresponding to the first conversational moment type, displaying, in a second portion of the GUI, the first set of one or more conversational conditions corresponding to the first conversational moment type;

based on detecting a selection of (a) a second set of conversational conditions, from among the first set of one or more conversational conditions, and (b) an action to be performed by a system in response to detecting the second set of conversational conditions:
generating first conversational moment configuration data storing the second set of conversational conditions and the action in association with a first conversational moment of the first conversational moment type; and configuring the system to perform the action in response to detecting the second set of conversational conditions in a monitored conversation.

* * * * *